United States Patent
Lee et al.

(10) Patent No.: US 11,118,129 B2
(45) Date of Patent: Sep. 14, 2021

(54) LUBRICANT COMPOSITION AND METHOD OF PREPARING COPOLYMER USING THE SAME

(71) Applicants: SK Innovation Co., Ltd., Seoul (KR); SK Global Chemical Co., Ltd., Seoul (KR)

(72) Inventors: Ho Seong Lee, Daejeon (KR); Sun Joo Kim, Daejeon (KR); Jin Haek Yang, Daejeon (KR)

(73) Assignees: SK Innovation Co., Ltd., Seoul (KR); SK Global Chemical Co., Ltd., Seoul (KR)

( * ) Notice: Subject to any disclaimer, the term of this patent is extended or adjusted under 35 U.S.C. 154(b) by 0 days.

(21) Appl. No.: 16/923,202

(22) Filed: Jul. 8, 2020

(65) Prior Publication Data

US 2021/0009919 A1    Jan. 14, 2021

(30) Foreign Application Priority Data

Jul. 9, 2019    (KR) .................. 10-2019-0082484

(51) Int. Cl.
| | |
|---|---|
| *C10M 169/04* | (2006.01) |
| *C08F 110/02* | (2006.01) |
| *C08F 220/06* | (2006.01) |
| *C10M 101/02* | (2006.01) |
| *C10M 129/14* | (2006.01) |
| *C10M 135/36* | (2006.01) |
| *C08J 3/00* | (2006.01) |

(52) U.S. Cl.
CPC ......... *C10M 169/04* (2013.01); *C08F 110/02* (2013.01); *C08F 220/06* (2013.01); *C10M 101/02* (2013.01); *C10M 129/14* (2013.01); *C10M 135/36* (2013.01); *C08J 3/005* (2013.01)

(58) Field of Classification Search
CPC ........ C10M 105/72; C10M 2205/0285; C10M 2221/04; C10M 2219/108; C10M 2217/06; C10M 2207/026; C10N 2030/08; C10N 2030/10; C07D 279/20
See application file for complete search history.

(56) References Cited

U.S. PATENT DOCUMENTS

| | | | |
|---|---|---|---|
| 4,853,446 A | 8/1989 | DeWald et al. |
| 5,034,156 A | 7/1991 | Varwig |
| 5,059,662 A | 10/1991 | Wikelski et al. |
| 6,025,515 A | 2/2000 | Shahid |
| 8,664,415 B2 | 3/2014 | Bette et al. |

(Continued)

FOREIGN PATENT DOCUMENTS

| | | |
|---|---|---|
| GB | 1603535 | 11/1981 |
| JP | 2516003 B2 | 4/1996 |

(Continued)

*Primary Examiner* — Vishal V Vasisth
(74) *Attorney, Agent, or Firm* — The Webb Law Firm

(57) ABSTRACT

A lubricant composition includes a base oil, a phenothiazine-based polymerization inhibitor, and a polymerization inhibitory accelerator including a hindered phenol-based compound and a hydroquinone-based compound. A self-polymerization in a polymerizing process is suppressed by an interaction between the polymerization inhibitor and the polymerization inhibitory accelerator. A method of preparing a copolymer using the lubricant composition is also provided.

13 Claims, 1 Drawing Sheet

(56) References Cited

U.S. PATENT DOCUMENTS

| | | | |
|---|---|---|---|
| 2009/0234161 A1 | 9/2009 | Paul | |
| 2016/0304417 A1* | 10/2016 | Masere | ................... C07C 7/20 |
| 2017/0009174 A1* | 1/2017 | Patil | ................... C10M 135/36 |
| 2017/0260474 A1* | 9/2017 | Gutermuth | ................ C08F 2/38 |

FOREIGN PATENT DOCUMENTS

| | | |
|---|---|---|
| KR | 19960007168 B1 | 5/1995 |
| WO | 2007064843 A1 | 6/2007 |
| WO | 2016172076 A1 | 10/2016 |
| WO | 2017041204 A1 | 3/2017 |

\* cited by examiner

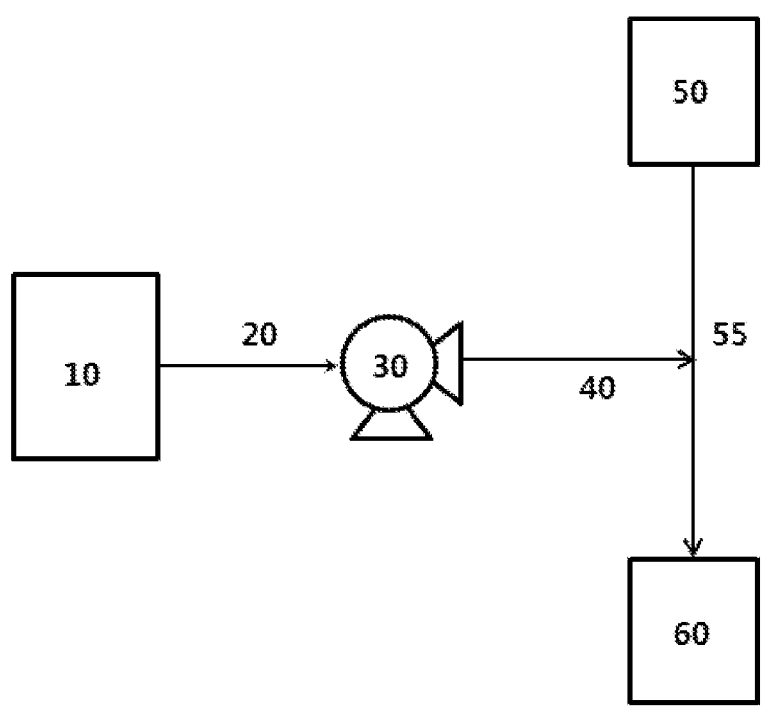

LUBRICANT COMPOSITION AND METHOD OF PREPARING COPOLYMER USING THE SAME

CROSS-REFERENCE TO RELATED APPLICATION

This application claims priority to Korean Patent Applications No. 10-2019-0082484 filed Jul. 9, 2019, the disclosure of which is hereby incorporated by reference in its entirety.

BACKGROUND OF THE INVENTION

1. Field of the Invention

The present invention relates to a lubricant composition and a method of preparing a copolymer using the same. More particularly, the present invention relates to a lubricant composition including a base oil and an additive and a method of preparing a copolymer using the same.

2. Description of the Related Art

For example, an ethylene-carboxylic acid copolymer such as an ethylene-acrylic acid copolymer is utilized for various applications such as a sealant, an adhesive, a packing material, an optical film, etc.

The ethylene-carboxylic acid copolymer may be prepared by polymerizing ethylene and a carboxylic acid-based compound (e.g., acrylic acid, methacrylic acid, etc.) as a comonomer in a continuous reactor.

The carboxylic acid-based compound may have a self-reactivity higher than that of ethylene, and thus may be self-polymerized when exposed to a high temperature in a supply through a flow path, a pump, a compressor, etc.

In this case, defects such as a clogging, a flow blocking in aforementioned equipment such as the pump, the compressor, the flow path, etc., may be caused, and thus a production yield of the copolymer may be degraded and a constant repetition of the polymerization process may not be performed.

Thus, methods of using additives for suppressing the self-polymerization in addition to the monomers for the synthesis of the copolymer are being researched. However, development of a composition applied to the equipment such as a lubricant may be also needed for directly suppressing the above-mentioned equipment defects.

For example, International Published Patent Application WO2016/172076 discloses a polymerization inhibitor for preventing a fouling in a polymerization reaction, but fails to suggest a construction for preventing the self-polymerization in the equipment and process unit.

SUMMARY OF THE INVENTION

According to an aspect of the present invention, there is provided a lubricant composition providing improved process reliability and polymerization efficiency.

According to an aspect of the present invention, there is provided a method of preparing a copolymer using the lubricant composition.

A lubricant composition according to exemplary embodiments includes a base oil, a phenothiazine-based polymerization inhibitor, and a polymerization inhibitory accelerator including a hindered phenol-based compound and a hydroquinone-based compound.

In some embodiments, the polymerization inhibitor may include a compound represented by Chemical Formula 1:

[Chemical Formula 1]

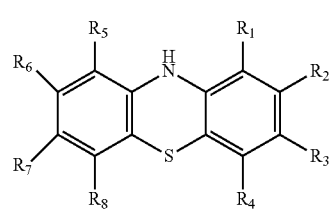

In Chemical Formula 1, $R_1$ to $R_8$ are each independently hydrogen, a C1 to C5 alkyl group or a C1 to C5 alkoxy group.

In some embodiments, an amount of the polymerization inhibitor may be from 1 ppm to 2,000 ppm relative to a weight of the base oil.

In some embodiments, the amount of the polymerization inhibitor may be from 1 ppm to 10 ppm relative to the weight of the base oil.

In some embodiments, the hindered phenol-based compound may be represented by Chemical Formula 2:

[Chemical Formula 2]

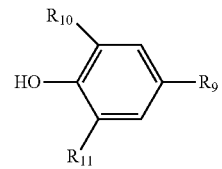

In Chemical Formula 2, $R_9$ to $R_{11}$ are each a C1-C5 alkyl group.

In some embodiments, the hindered phenol-based compound may be butylated hydroxytoluene (BHT).

In some embodiments, the hydroquinone-based compound may be represented by Chemical Formula 3:

[Chemical Formula 3]

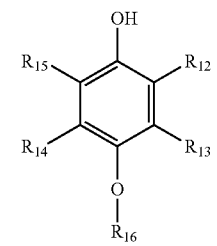

In Chemical Formula 3, $R_{12}$ to $R_{16}$ are each hydrogen or a C1 to C5 alkyl group. In some embodiments, the hydroquinone-based compound may be hydroquinone monomethyl ether (MeHQ)

In some embodiments, an amount of the polymerization inhibitory accelerator may be from 1 wt % to 10 wt % based on a weight of the base oil.

In some embodiments, the lubricant composition may further include a polar non-aromatic compound.

In some embodiments, the polar non-aromatic compound includes a fatty acid-based compound.

In some embodiments, an amount of the polar non-aromatic compound exceeds 1 wt % and is less than or equal to 10 wt %.

In a method of preparing a copolymer, the lubricant composition is injected into a discharge unit. A first monomer that includes a carboxylic acid-based monomer is discharged via the discharge unit. The discharged first monomer is reacted with a second monomer.

In some embodiments, the second monomer may be an ethylene-based polymerizable monomer.

In some embodiments, an injection rate of the lubricant composition into the discharge unit may be in a range from 25 kg/hr to 130 kg/hr.

In some embodiments, a temperature in the discharge unit is in a range from 20° C. to 120° C., and a discharge pressure from the discharge unit is in a range from 1,100 bar to 2,500 bar.

According to exemplary embodiments of the present invention, a polymerization inhibitor such as a phenothiazine-based compound may be added in a lubricant oil of a pump discharging, e.g., a carboxylic acid-based monomer, and a polymerization inhibitory accelerator including a hindered phenol-based compound and a hydroquinone-based compound may be also added.

The polymerization inhibitory accelerator may regenerate a radicalized phenothiazine-based compound to activate a polymerization inhibiting mechanism. Thus, a suppression of a self-polymerization of the carboxylic acid-based monomer may be maintained for a long period even by a small amount of the polymerization inhibitor to improve a production yield of a copolymer and prevent a blocking of polymerization equipment.

In some embodiments, the lubricant composition may further include a polar non-aromatic compound. The polar non-aromatic compound may increase a solubility of the hindered phenol-based compound and may additionally promote a regeneration of the phenothiazine-based compound.

BRIEF DESCRIPTION OF THE DRAWINGS

FIG. 1 is a process diagram schematically illustrating a method of preparing a copolymer in accordance with exemplary embodiments.

DETAILED DESCRIPTION OF THE EMBODIMENTS

According to exemplary embodiments of the present invention, a lubricant composition including a polymerization inhibitor, a polymerization inhibitory accelerator including a hindered phenol-based compound and a hydroquinone-based compound, and a base oil is provided. According to exemplary embodiments of the present invention, a method of preparing a copolymer using the lubricant composition and effectively suppressing a self-polymerization of a monomer is also provided Hereinafter, the present invention will be described in detail with reference to specific experimental examples and the accompanying drawings. However, those skilled in the art will appreciate that such embodiments described with reference to the examples and the accompanying drawings are provided to further understand the spirit of the present invention and do not limit subject matters to be protected as disclosed in the detailed description and appended claims.

Lubricant Composition

A lubricant composition according to exemplary embodiments may include a base oil, a polymerization inhibitor and a polymerization inhibitory accelerator. In some embodiments, the lubricant composition may further include a polar non-aromatic compound.

The base oil may be included as a base solvent, a diluent or a media of the lubricant composition. A type of the base oil is not particularly limited, and a lubricating oil used in a polymerization equipment, a petrochemical equipment, etc., may be used. For example, a mineral oil can be used as the base oil.

The base oil may be included as a residual amount of the lubricant composition excluding components described below. The term "residual amount" used herein is to be understood as a variable amount that may be adjusted according to amounts of other ingredients.

The polymerization inhibitor may be included, e.g., as a component for inhibiting a self-polymerization of a carboxylic acid-based monomer. In exemplary embodiments, the polymerization inhibitor may include a phenothiazine-based compound represented by Chemical Formula 1 below.

[Chemical Formula 1]

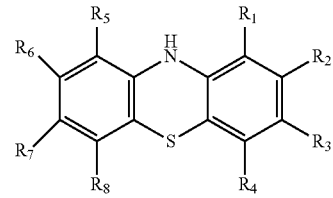

In the Chemical Formula 1 above, $R_1$ to $R_8$ may each independently be hydrogen, a C1 to C5 alkyl group or a C1 to C5 alkoxy group.

In some embodiments, an amount of the polymerization inhibitor may be about 2,000 ppm or less based on a weight of the base oil. When the amount of the polymerization inhibitor exceeds about 2,000 ppm, an environmental issue may be caused due to an excessive increase of a radical-based active material, and a copolymer yield may be also degraded.

Preferably, the amount of the polymerization inhibitor may be about 1,000 ppm or less, more preferably in a range from about 1 ppm to about 10 ppm, based on the weight of the base oil. Within the above range, a regeneration mechanism by a polymerization inhibitory accelerator described below may be more easily implemented.

In exemplary embodiments, the polymerization inhibitory accelerator may be used together with the polymerization inhibitor described above. The polymerization inhibitory accelerator may include a hindered phenol-based compound and a hydroquinone-based compound.

The hindered phenol-based compound may be represented by Chemical Formula 2 below.

[Chemical Formula 2]

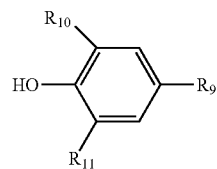

In the Chemical Formula 2 above, $R_9$ to $R_{11}$ may each be a C1-C5 alkyl group. In a preferable embodiment, $R_9$ may be a normal alkyl (n-alkyl) group, and $R_{10}$ and $R_{11}$ may each independently be a secondary (sec)-alkyl group, an iso-alkyl group, or a tert-alkyl group. Preferably, $R_{10}$ and $R_{11}$ may each include a tert-alkyl group, and in one embodiment, the hindered phenol-based compound may be butylated hydroxytoluene (BHT) represented by the following Chemical Formula 2-1.

[Chemical Formula 2-1]

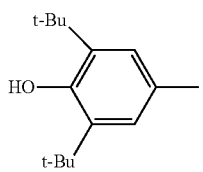

The hydroquinone-based compound may be represented by Chemical Formula 3 below.

[Chemical Formula 3]

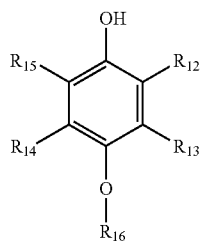

In the Chemical Formula 3 above, $R_{12}$ to $R_{16}$ may each be hydrogen or a C1 to C5 alkyl group. In some embodiments, the hydroquinone-based compound may be hydroquinone monomethyl ether (MeHQ) represented by Chemical Formula 3-1 below.

[Chemical Formula 3-1]

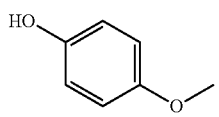

An acidic hydrogen contained in a hydroxyl group included in the above-mentioned hindered phenol-based compound may be transferred to the phenothiazine-based compound (the polymerization inhibitor), and the radicalized phenothiazine-based compound may be regenerated. Thus, life-span of the phenothiazine-based compound may be increased so that self-polymerization inhibition of the carboxylic acid-based monomer may be effectively maintained even with a small amount of polymerization inhibitor.

Further, an acidity of hydrogen included in the hydroxyl group may be increased by a relatively bulky alkyl group ($R_{10}$, $R_{11}$, e.g., a tert-butyl group) included in the hindered phenol-based compound so that the hydrogen transfer may easily occur.

A solubility with respect to the base oil may be also enhanced by the relatively bulky alkyl group so that the regeneration of the polymerization inhibitor by the hindered phenol-based compound may be constantly maintained.

The hindered phenol-based compound may have a relatively low solubility with respect to the carboxylic acid-based monomer (e.g., an acrylic acid). In exemplary embodiments, the hydroquinone-based compound having a high solubility in a carboxylic acid-based monomer solution may be used together with the hindered phenol-based compound. Thus, in a polymerization system in which both the monomer solution and the lubricant composition are co-present, the improved polymerization inhibitory effect and polymerization inhibitor regeneration effect may be constantly maintained.

In some embodiments, an amount of the polymerization inhibitory accelerator including the hindered phenol-based compound and the hydroquinone-based compound may be in a range from about 1 wt % to 20 wt % based on a total weight of the base oil. Within the above range, reduction of solubility in the polymerization system may be prevented while achieving the sufficient regeneration of the polymerization inhibitor.

In an embodiment, the amount of the polymerization inhibitory accelerator may be in a range from about 1 wt % to about 10 wt % based on the total weight of the base oil. For example, an amount of the hindered phenol-based compound in the polymerization inhibitory accelerator may be from about 1 wt % to 6 wt % based on the total weight of the base oil. If the amount of the hindered phenol-based compound exceeds about 6 wt %, an oxidation of the base oil or the lubricant composition may be caused to result in an oil discoloration.

In an embodiment, the amount of the hindered phenol-based compound in the polymerization inhibitory accelerator may be greater than the amount of the hydroquinone-based compound. In this case, a sufficient polymerization inhibitor regeneration effect may be easily implemented in the lubricant composition.

In some embodiments, the lubricant composition may further include a polar non-aromatic compound. The polar non-aromatic compound may serve as a diluent or corrosion inhibitor of the polymerization inhibitory accelerator (e.g., the hindered phenol-based compound) as described above. Additionally, the polar non-aromatic compound may provide an intermediate medium or an intermediate path of the polymerization inhibitor regeneration mechanism.

In exemplary embodiments, the polar non-aromatic compound may include a C10 to C30 fatty acid (e.g., an oleic acid)-based compound.

The polar non-aromatic compound may be added together with the hindered phenol-based compound (e.g., BHT) as described above so that a regeneration cycle of the polymerization inhibitor (e.g., phenothiazine) may be repeated.

For example, hydrogen bonded to a nitrogen atom of phenothiazine may be released and transferred to a radicalized fatty acid to generate an activated phenothiazine radical. The activated phenothiazine radical may be regenerated into phenothiazine by receiving hydrogen from the hydroxyl group contained in the hindered phenol-based compound.

The above-mentioned cycle may be repeated so that an activation of the polymerization inhibitor may be repeatedly regenerated in a polymerization system. Thus, the self-polymerization inhibitory effect of the carboxylic acid-based monomer may be implemented for a long period even with a small amount of the polymerization inhibitor.

In an embodiment, an amount of the polar non-aromatic compound may exceed 1 wt % based on a total weight of the base oil. In this case, solubility of the hindered phenol-based compound may be sufficiently obtained, and the polymerization inhibitor regeneration cycle may be easily initiated. In an embodiment, the amount of the polar non-aromatic compound may be 10 wt % or less, preferably 5 wt % less while exceeding 1 wt %.

Method Preparing Copolymer

FIG. 1 is a process diagram schematically illustrating a method of preparing a copolymer in accordance with exemplary embodiments.

Referring to FIG. 1, a first monomer including a carboxylic acid-based monomer may be provided from a first monomer supply unit 10.

The carboxylic acid-based monomer may include an unsaturated carboxylic acid capable of participating in chain polymerization reaction. In exemplary embodiments, (meth) acrylic acid or an ester thereof (e.g., (meth)acrylate) may be used as the carboxylic acid-based monomer. The term "(meth)acrylic acid" used herein is used to encompass methacrylic acid and acrylic acid.

For example, the carboxylic acid-based monomer may be transferred from the first monomer supply unit 10 such as a storage tank to a discharge unit 30 through a first flow path 20.

For example, one or more additives such as a polymerization initiator, a reaction inhibitor, an antioxidant, etc., may be also supplied.

For example, the polymerization initiator may include initiators widely known in the polymer polymerization field. For example, a peroxide or peroxy-based compound, an azobis-based compound, or the like, may be used as the polymerization initiator.

The carboxylic acid-based monomer may be transferred to the discharge unit 30 and may be discharged for a copolymerization with, e.g., an ethylene-based polymerizable monomer through a discharge flow path 40.

The discharge unit 30 may include a discharge equipment, e.g., a pump, a compressor, or the like. In exemplary embodiments, the above-described lubricant composition may be injected into the discharge unit 30.

For example, the discharge unit 30 may include a piston and a cylinder structure such as a bushing surrounding the piston, and the lubricant composition according to the exemplary embodiments may be injected into a gap between the piston and the cylinder structure.

A friction may repeatedly occur between the piston and the cylinder structure in the gap, and thus a local temperature rise may be caused by a frictional heat. Accordingly, a self-polymerized polymer such as polyacrylic acid (PAA) may be generated when exceeding the temperature at the carboxylic acid-based monomer is self-polymerized. In this case, a clogging of the gap may be caused to shorten an exchange cycle or a cleaning cycle of the discharge unit 30, thereby reducing a process efficiency, and a desired copolymer yield may also be deteriorated.

However, the above-described lubricant composition may include the hindered phenol/hydroquinone-based polymerization inhibitory accelerator together with the polymerization inhibitor such as phenothiazine so that the regeneration mechanism of the polymerization inhibitor may be remarkably activated.

Thus, a use cycle of the discharge unit 30 may be increased, and the formation of self-polymerized polymer such as PAA may be suppressed to improve process reliability.

In some embodiments, an injection rate of the lubricant composition into the discharge unit 30 may be 20 kg/hr or more, and may be preferably adjusted in a range of 25 kg/hr to 130 kg/hr. Within the above range, the self-polymerization may be effectively suppressed through a uniform contact with the carboxylic acid-based monomer supplied to the discharge unit 30.

The second monomer stored in a second monomer supply unit 50 may be moved through a second flow path 55 to contact the carboxylic acid-based monomer supplied through the discharge flow path 40, and may be copolymerized in a reactor 60. In exemplary embodiments, the second monomer may include an ethylene-based polymerizable monomer.

If ethylene is used as the second monomer, the copolymerization of the carboxylic acid-based monomer and ethylene in the reactor 60 may proceed to produce an ethylene-carboxylic acid copolymer (e.g., EAA copolymer).

In some embodiments, the polymerization initiator as described above may be also introduced into the reactor 60 through the second flow path 55 or through an additional flow path. In this case, the self-polymerization of the carboxylic acid-based monomer may be prevented from being accelerated in advance by the polymerization initiator.

In some embodiments, a chain transfer agent may be introduced through, e.g., the second flow path 55 during the polymerization process. A molecular weight and a molecular weight distribution of the polymer product may be easily controlled in a desired range by a chain transfer agent.

The chain transfer agents may include, e.g., a non-polar organic compound such as isobutane, propene, etc., or a polar organic compound such as methyl ethyl ketone, isopropyl aldehyde, vinyl acetate, etc.

Process conditions in the discharge unit 30 and the reactor 60 may be adjusted in consideration of the self-polymerization prevention of the carboxylic acid-based monomer and an efficiency of a copolymer production.

In some embodiments, a temperature in the discharge unit 30 may be lower than a temperature in the reactor 60. For example, the temperature in the discharge unit 30 may be from about 20° C. to about 120° C., and the temperature in the reactor 60 may be from about 150° C. to about 270° C.

In some embodiments, a pressure in the discharge unit 30 and the reactor 60 may be in a range from 1100 bar to 2500 bar, preferably from 1300 bar to 2300 bar. In one embodiment, a discharge pressure in the discharge unit 30 may be greater than a copolymerization pressure in the reactor 60.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Experimental Example 1: Measuring Self-Polymerization of Acrylic Acid

In a nitrogen atmosphere treated 1 L reactor, acrylic acid (AA) (99% purity, manufactured by Sigma Aldrich) and lubricant compositions were mixed and sealed with contents shown in Table 1 below. The reactor was heated to 120° C. and the generation of self-polymerized polymer (PAA) was observed every 10 minutes. When PAA was observed by the naked eye, the experiment was stopped and a polymerization time was recorded. Measured results of the polymerization time are shown in Table 1 below.

In Table 1, amounts of PTZ and MeHQ are listed as ppm relative to a mineral oil of the lubricant composition, amounts of BHT are listed as weight percents relative to the mineral oil.

TABLE 1

| | Lubricant Composition | | | | | |
|---|---|---|---|---|---|---|
| | Acrylic Acid (AA)(g) | PTZ (ppm) | BHT (wt %) | MeHQ (ppm) | Mineral Oil (g) | Polymerization Time |
| Comparative Example 1 | 5 | 0 | 0 | 0 | 5 | Immediately |
| Comparative Example 2 | 5 | 50 | 0 | 0 | 5 | Immediately |
| Comparative Example 3 | 5 | 100 | 0 | 0 | 5 | Immediately |
| Comparative Example 4 | 5 | 300 | 0 | 0 | 5 | Immediately |
| Comparative Example 5 | 5 | 500 | 0 | 0 | 5 | 2 minutes |
| Comparative Example 6 | 5 | 700 | 0 | 0 | 5 | 48 minutes |
| Comparative Example 7 | 5 | 0 | 6 | 170 | 5 | 34 minutes |
| Example 1 | 5 | 1 | 6 | 170 | 5 | More than 2 weeks |
| Example 2 | 5 | 2 | 6 | 170 | 5 | More than 2 weeks |
| Example 3 | 5 | 5 | 6 | 170 | 5 | More than 2 weeks |

PTZ: Phenothiazine (Sigma Aldrich)
BHT: Butylated hydroxy toluene (Sigma Aldrich)
MeHQ: 4-methoxy phenol (Sigma Aldrich)
Mineral Oil: SK lubricants Referring to Table 1, when PTZ was solely used as the polymerization inhibitor in the lubricant composition, the inhibition of PAA production was not effectively achieved. Additionally, when the amount of PTZ that is environmentally hazardous due to a radical activity was significantly increased, an effective polymerization inhibition time was obtained as shown in Comparative Example 6.

However, when BHT and MeHQ were used together as the polymerization inhibitor, the polymerization delay time was rapidly increased even with a small amount of PTZ.

Further, the lubricant composition of Example 4 was prepared by the same manner as that in Example 3 except that BHT was included in 8 wt %. In the case of Example 4, a similar level of the polymerization time as that in Example 3 was measured, but yellowing of the lubricant composition occurred.

Experimental Example 2: Measuring Self-Polymerization when Using Diluent

Similarly to Experimental Example 1, the self-polymerization time of acrylic acid was measured using samples of a lubricant composition including a mineral oil, PTZ and a diluent. Diluents manufactured by Sigma Aldrich were used.

Measurement results are shown in Table 2 below.

TABLE 2

| | Lubricant Composition | | | | |
|---|---|---|---|---|---|
| | Acrylic Acid (AA)(g) | PTZ (ppm) | Mineral Oil (g) | Diluent (wt % relative to mineral oil) | Polymerization Time |
| Sample 1 | 5 | 0 | 5 | Di(propylene glycol)methyl ether | 1 | Immediately |
| Sample 2 | 5 | 0 | 5 | Di(propylene glycol)methyl ether | 5 | Immediately |
| Sample 3 | 5 | 50 | 5 | Di(propylene glycol)methyl ether | 5 | Immediately |
| Sample 4 | 5 | 0 | 5 | Poly(ethylene glycol) | 1 | Immediately |
| Sample 5 | 5 | 0 | 5 | Poly(ethylene glycol) | 5 | Immediately |
| Sample 6 | 5 | 50 | 5 | Poly(ethylene glycol) | 5 | Immediately |
| Sample 7 | 5 | 0 | 5 | Xylene | 1 | Immediately |
| Sample 8 | 5 | 0 | 5 | Xylene | 5 | Immediately |
| Sample 9 | 5 | 50 | 5 | Xylene | 5 | Immediately |
| Sample 10 | 5 | 0 | 5 | Oleic Acid | 1 | Immediately |
| Sample 11 | 5 | 0 | 5 | Oleic Acid | 5 | Immediately |
| Sample 12 | 5 | 50 | 5 | Oleic Acid | 1 | Immediately |
| Sample 13 | 5 | 50 | 5 | Oleic Acid | 2 | 2 hour 5 minutes |
| Sample 14 | 5 | 50 | 5 | Oleic Acid | 5 | 5 hour 36 minutes |

PTZ: Phenothiazine (Sigma Aldrich)
BHT: Butylated hydroxy toluene (Sigma Aldrich)
MeHQ: 4-methoxy phenol (Sigma Aldrich)
Mineral Oil: SK lubricants Referring to Table. 2, when the diluent such as a glycol-based compound or a non-polar aromatic compound such as xylene was added to PTZ, the polymerization inhibitory effect was not substantially implemented.

In Samples 10-14 in which a fatty acid-based polar non-aromatic compound such as oleic acid was included as the diluent in the lubricant composition together with PTZ, the polymerization inhibition time was remarkably increased when the amount of the oleic acid exceeded 1 wt %.

What is claimed is:

1. A lubricant composition for producing an ethylene-carboxylic acid copolymer, comprising:
a base oil;
a phenothiazine-based polymerization inhibitor including a compound represented by Chemical Formula 1:

[Chemical Formula 1]

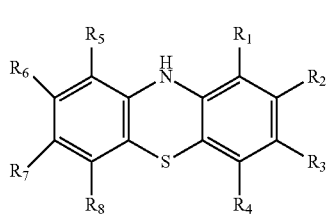

wherein, in Chemical Formula 1, $R_1$ to $R_8$ are each independently hydrogen, a C1 to C5 alkyl group or a C1 to C5 alkoxy group; and
a polymerization inhibitory accelerator including a hindered phenol-based compound and a hydroquinone-based compound,
wherein the hindered phenol-based compound is represented by Chemical Formula 2 and the hydroquinone-based compound is represented by Chemical Formula 3:

[Chemical Formula 2]

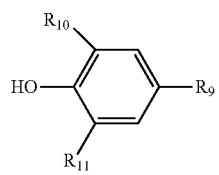

[Chemical Formula 3]

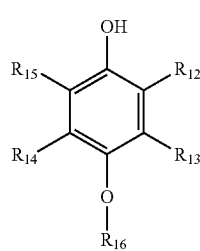

wherein, in Chemical Formula 2, $R_9$ to $R_{11}$ are each a C1-C5 alkyl group,
wherein, in Chemical Formula 3, $R_{12}$ to $R_{16}$ are each hydrogen or a C1 to C5 alkyl group.

2. The lubricant composition according to claim 1, wherein an amount of the polymerization inhibitor is from 1 ppm to 2,000 ppm relative to a weight of the base oil.

3. The lubricant composition according to claim 2, wherein the amount of the polymerization inhibitor is from 1 ppm to 10 ppm relative to the weight of the base oil.

4. The lubricant composition according to claim 1, wherein the hindered phenol-based compound is butylated hydroxytoluene (BHT).

5. The lubricant composition according to claim 1, wherein the hydroquinone-based compound is hydroquinone monomethyl ether (MeHQ).

6. The lubricant composition according to claim 1, wherein an amount of the polymerization inhibitory accelerator is from 1 wt % to 10 wt % based on a weight of the base oil.

7. The lubricant composition according to claim 1, further comprising a polar non-aromatic compound.

8. The lubricant composition according to claim 7, wherein the polar non-aromatic compound includes a fatty acid-based compound.

9. The lubricant composition according to claim 7, wherein an amount of the polar non-aromatic compound exceeds 1 wt % and is less than or equal to 10 wt %.

10. A method of preparing an ethylene-carboxylic acid copolymer, comprising:
injecting the lubricant composition according to claim 1 into a discharge unit;
discharging a first monomer that includes a carboxylic acid-based monomer via the discharge unit; and
reacting the discharged first monomer with a second monomer.

11. The method according to claim 10, wherein the second monomer is an ethylene-based polymerizable monomer.

12. The method according to claim 10, wherein an injection rate of the lubricant composition into the discharge unit is in a range from 25 kg/hr to 130 kg/hr.

13. The method according to claim 10, wherein a temperature in the discharge unit is in a range from 20° C. to 120° C., and a discharge pressure from the discharge unit is in a range from 1,100 bar to 2,500 bar.

* * * * *